United States Patent

Vigna et al.

[11] Patent Number: 6,003,374
[45] Date of Patent: Dec. 21, 1999

[54] ACCELERATION SENSOR AND A METHOD FOR ITS MANUFACTURE

[75] Inventors: Benedetto Vigna, Potenza; Paolo Ferrari, Gallarate-Varese; Ubaldo Mastromatteo, Cornaredo-Milano, all of Italy

[73] Assignee: SGS-Thomson Microelectronics S.R.L., Agrate Brianza, Italy

[21] Appl. No.: 08/925,599

[22] Filed: Sep. 8, 1997

[30] Foreign Application Priority Data

Sep. 10, 1996 [EP] European Pat. Off. .............. 96830464

[51] Int. Cl.$^6$ ..................................................... G01P 15/11
[52] U.S. Cl. ..................................... 73/514.31; 73/862.69
[58] Field of Search .......................... 73/514.31, 514.14, 73/514.16, 514.01, 514.02, 862.381, 862.391, 862.69, 779; 324/209, 207.17

[56] References Cited

U.S. PATENT DOCUMENTS

| | | | |
|---|---|---|---|
| 3,307,405 | 3/1967 | Stucki | 73/862.69 |
| 3,664,187 | 5/1972 | Goransson | 73/862.69 |
| 4,322,973 | 4/1982 | Iwasaki | 73/514.31 |
| 4,848,157 | 7/1989 | Kobayashi | 73/517 R |
| 5,142,227 | 8/1992 | Fish | 73/862.69 |
| 5,195,377 | 3/1993 | Garshelis | 73/862.69 |
| 5,723,789 | 3/1998 | Shannon | 73/514.31 |

FOREIGN PATENT DOCUMENTS 1 300 367  7/1997  United Kingdom ............ G01P 15/08

*Primary Examiner*—Hezron Williams
*Assistant Examiner*—Helen C. Kwok
*Attorney, Agent, or Firm*—Allen, Dyer, Doppelt, Milbrath & Gilchrist, P.A.

[57] ABSTRACT

An acceleration sensor is described which is formed by planar technology on a substrate. It includes a core of ferromagnetic material and, coupled conductively together by the core, a first winding adapted to be connected to a power supply and a second winding adapted to be connected to circuit means for measuring an electrical magnitude induced therein. The core has two suspended portions which are free to bend as a result of an inertial force due to an accelerative movement of the sensor itself. The bending causes lengthening of the core and hence a variation in the reluctance of the magnetic circuit. If a constant current is supplied to the first winding, a voltage is induced in the second winding as a result of the variation in the magnetic flux caused by the variation in reluctance.

22 Claims, 3 Drawing Sheets

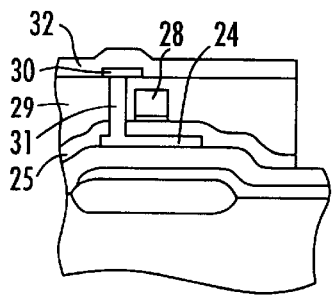
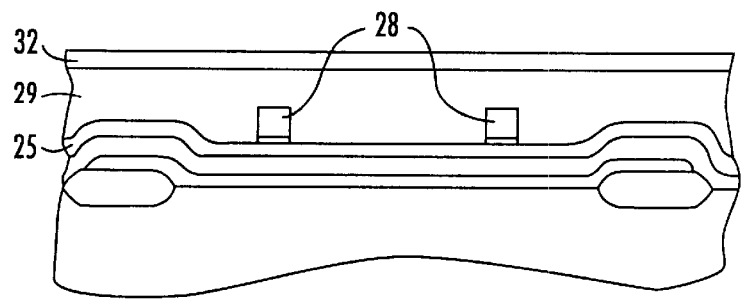
FIG. 8    FIG. 14
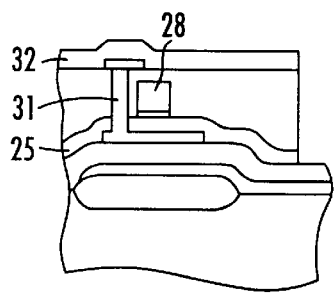
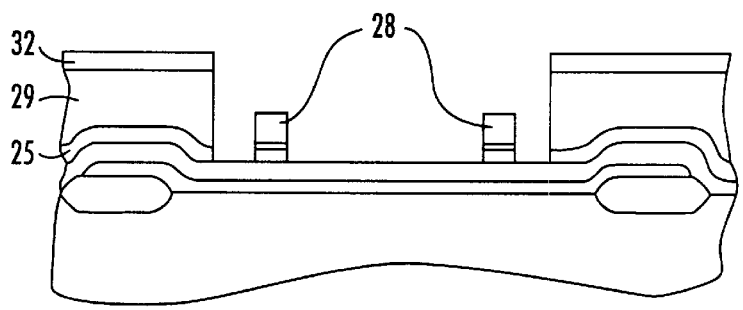
FIG. 9    FIG. 15
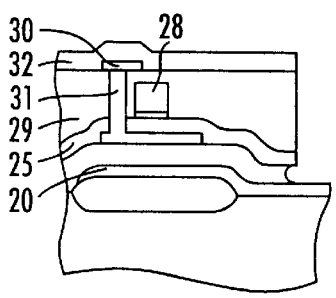
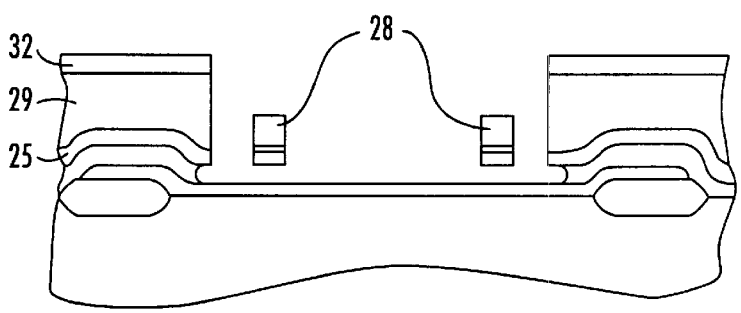
FIG. 10    FIG. 16

ACCELERATION SENSOR AND A METHOD FOR ITS MANUFACTURE

FIELD OF THE INVENTION

The present invention relates to devices for converting an acceleration into an electrical quantity and, more particularly, to an acceleration sensor and to a method for its manufacture.

BACKGROUND OF THE INVENTION

Acceleration sensors are used in many fields of technology. For example, in the motor vehicle industry they are used to control various devices, such as air bags, ABS braking systems, active suspensions, inertial orientation systems and several engine parts.

Various types of acceleration sensors are known which differ from each other in their construction and principle of operation. In recent years, in addition to conventional sensors made on the macroscopic scale and including mechanical switches sensitive to acceleration, miniaturized planar sensors have also been devised and made available. The miniaturized sensors are made using techniques typical for semiconductor devices, such as the planar technology. In many cases, they are formed on a substrate of semiconductive material together with the circuits and electronic components necessary for the amplification and processing of the signal produced thereby. These latter sensors have many advantages over conventional ones, as well as the obvious ones of smaller size, lower cost, greater reliability, improved signal-to-noise ratio, integrability with processing and memory devices, better reproducibility, etc.

The methods of manufacture of planar sensors are based on processing a wafer of semiconductor material, typically silicon, on both of its faces. This is typically done by means of anisotropic etching steps (bulk micromachining), or on only one face by deposition and selective removal of thin films and isotropic etching steps (surface micromachining). This latter type of working or processing is particularly suitable for integration of the structure of the sensor with the processing circuits.

With regard to the operation of planar sensors, this is based on the effect of the acceleration on a structure which has a so-called seismic mass, and which is anchored to the substrate by a mechanical suspension element. The seismic mass, when subject to an inertial force due to an acceleration, moves relative to the substrate, possibly deforming and causing stress in the suspension element. The movement and/or deformation and/or stress are converted into an electrical signal which is then amplified and processed as necessary.

In a known sensor, the seismic mass is provided by one electrode of a capacitor, and wherein the second electrode is in the substrate. A movement of the seismic mass causes a variation in the capacitance of the capacitor which, in turn, is detected and processed by a suitable circuit.

SUMMARY OF THE INVENTION

An object of the invention is to provide a sensor of the type which can be made by surface micromachining, the operation of which is based on the effect of an inertial force on an element anchored to the substrate and which lends itself to being made easily by techniques compatible with the usual industrial processes for the manufacture of integrated circuits, and which is both very small and capable of producing an analog signal.

Another object of the invention is to provide a method for the manufacture of a sensor of the type indicated above.

These and other objects, advantages, and features in accordance with the present invention are provided by an acceleration sensor comprising: a substrate; a core of ferromagnetic material on the substrate, the core having at least one suspended portion free to bend responsive to an inertial force caused by an accelerative movement of the sensor; and output means for generating a signal representative of an acceleration of the sensor based upon movement of the at least one suspended portion of the core. The output means may be provided by a first winding on a first portion of the core adapted to be connected to a constant voltage power supply and a second winding on a second portion of the core and being inductively coupled to the first winding through the core. In addition, the output means may also include circuit means connected to the second winding for measuring an electrical quantity induced therein and representative of the accelerative movement of the sensor. The circuit means is preferably formed in the substrate.

The core may have a generally rectangular shape comprising first and second opposite pairs of sides. A first pair of sides are fixed to the substrate. The substrate preferably has a sunken area at least in correspondence with the second pair of sides thus defining two suspended portions of the core. The acceleration sensor may further comprise a casing hermetically sealing the substrate, the core, the first and second windings, and the circuit means in an air or nitrogen atmosphere, for example.

A method aspect of the invention is for making an acceleration sensor comprising the steps of: forming a core of ferromagnetic material on a substrate so that the core has at least one suspended portion; forming a first winding on a first portion of the core and adapted to be connected to a power supply; and forming a second winding on a second portion of the core to be inductively coupled to the first winding through the core. The method also preferably comprises the step of forming a circuit in the substrate for measuring an electrical quantity induced in the second winding and representative of an acceleration of the sensor based upon movement of the at least one suspended portion of the core.

BRIEF DESCRIPTION OF THE DRAWINGS

The invention will be better understood from the following detailed description of one embodiment thereof, given by way of non-limitative example, made in relation to the appended drawings, in which:

FIGS. 5 to 10 are sectional views of part of the acceleration sensor of FIG. 4 in various stages of manufacture, and FIGS. 11 to 16 are sectional views of another part of the acceleration sensor of FIG. 4 in the same manufacturing stages as in FIGS. 5 to 10.

DETAILED DESCRIPTION OF THE PREFERRED EMBODIMENTS

Figure 1:
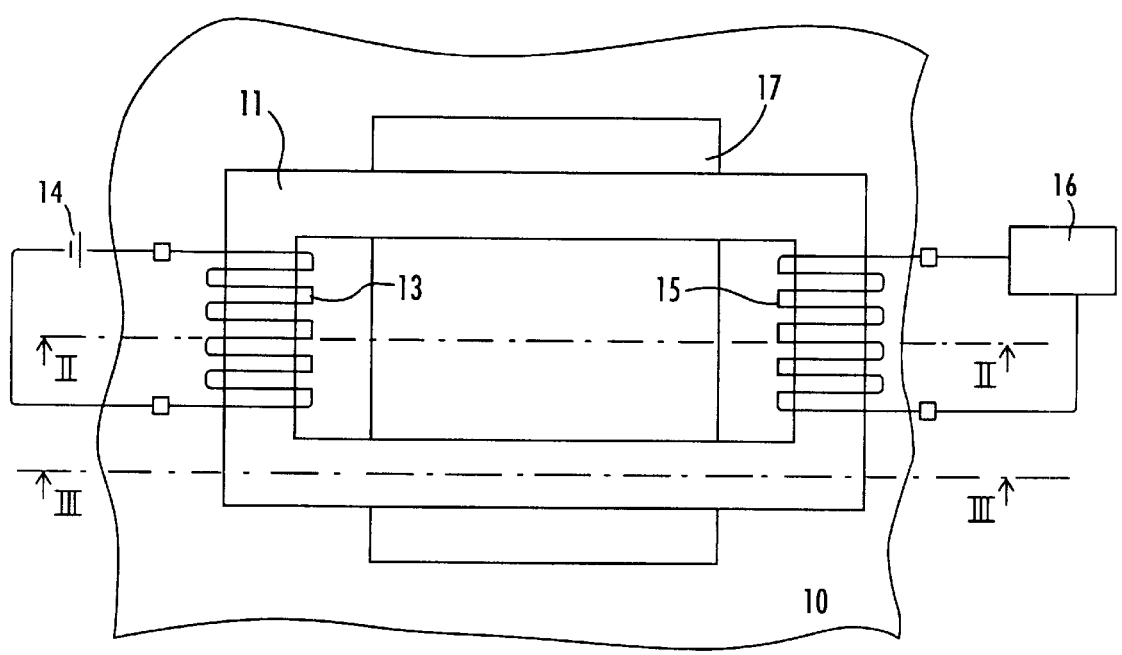
FIGS. 1 to 3 show schematically the structure of an acceleration sensor according to the invention, respectively, in plan, in section on the line II—II of FIG. 1, and in section on the line III—III of FIG. 1.
Figure 2:
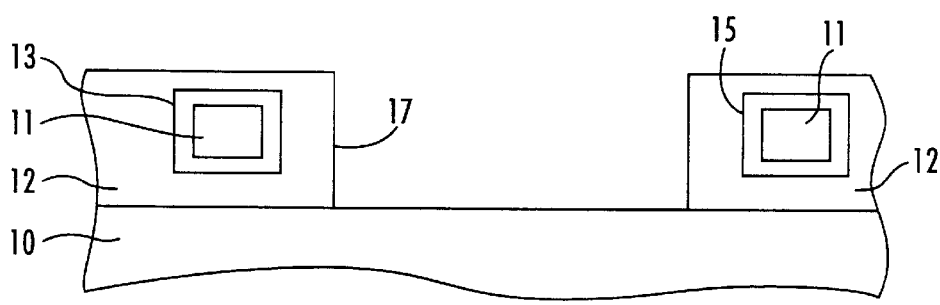
Figure 3:
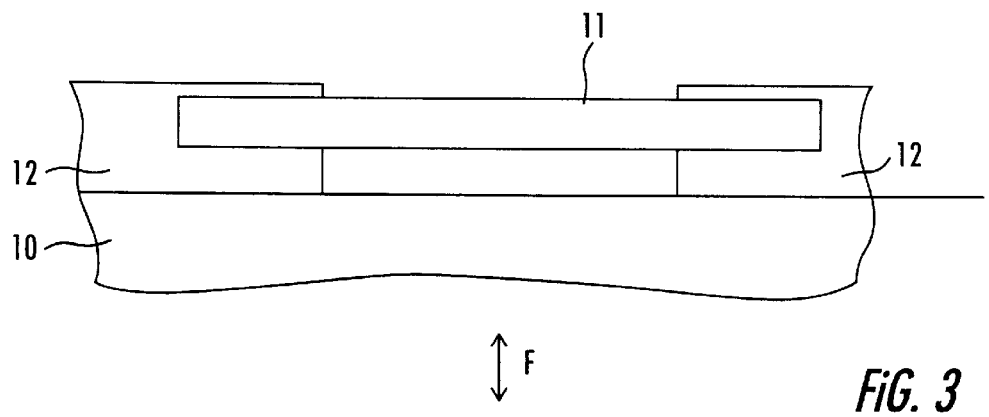

With reference firstly to FIGS. 1 to 3, the sensor according to the invention has a structure substantially like that of an integrated transformer made by planar technology on a substrate. The core of the transformer, indicated by reference numeral 11, is formed on the substrate, for example, a silicon wafer indicated by reference numeral 10. The core is in the shape of a frame and has two parts, including two opposite sides, fixed to the substrate 10, but insulated therefrom by a layer of dielectric material 12, such as, for example, silicon dioxide. Two windings provided by metal conductors are formed around the two opposite sides of the core 11 and are insulated from the core and encapsulated in the dielectric layer 12. One of the two windings, indicated by reference numeral 13, which acts as the excitation coil, is adapted to be connected to an external power supply, for example, a constant voltage supply 14, as shown. The other winding, indicated by reference numeral 15, which serves as the reading coil, is adapted to be connected to measuring means schematically shown in the drawing by a block 16 for measuring an electrical quantity induced therein.

The dielectric layer 12 has an opening 17 under part of the core 11 whereby the other two opposite sides of the core each have a suspended portion, that is, a portion which is free to bend if appropriately stressed.

The operation of the sensor 10 is based on the same operating principle as a transformer, that is, on the generation of an electromotive force as a result of a variation in magnetic flux. The excitation coil 13 generates a magnetic flux in the core which, if it varies, induces an electrical voltage in the reading coil 15. While, however, in an ordinary transformer, the excitation coil is supplied with a voltage which varies with time, in the sensor according to the invention, the excitation coil 13 is supplied with a constant voltage and the variation in magnetic flux is caused by a geometric deformation of the core 11 due to the acceleration. More particularly, when the structure undergoes an acceleration perpendicular to the substrate, as shown by an arrow F in FIG. 3, the suspended portions of the core 11 bend and thus lengthen as a result of the inertial forces which act thereon. The lengthening of the core 11 causes a variation in magnetic reluctance in the magnetic circuit provided by the core and, hence, a variation in the magnetic flux which is detected by the reading coil 15 as a voltage across its terminals.

Analytically, the operation of the sensor may be described by consideration of the laws which link the magnetic flux $\Phi$ in the core to the (constant) current I which passes through the coil (Hopkinson's Law):

$$N_1 I = R \Phi$$

where $N_1$ is the number of turns in the excitation coil 13 and R is the magnetic reluctance of the core 11, and the law of magnetic reluctance:

$$R = \frac{L}{\mu S}$$

where $\mu$ is the magnetic permeability of the material of which the core is made and L and S are the length and section of the magnetic circuit, respectively.

It can be shown that the absolute value of the voltage V induced in the reading coil is:

$$|V| = \frac{\delta \Phi}{\delta t} = N_2 \cdot N_1 \cdot I \cdot \frac{\mu S}{L^2} \cdot \frac{\delta L}{\delta A} \cdot \frac{\delta}{\delta t} \qquad (A)$$

where $N_2$ is the number of turns in the reading coil 15 and A is the acceleration. The measurement of the voltage V thus gives a measure of the acceleration A.

For the manufacture of an acceleration sensor according to the invention, one starts from a substrate 10 provided by a single crystal of silicon in which the circuits necessary for the amplification and processing of the signal generated by the sensor have been formed by known techniques for the manufacture of monolithic integrated circuits.

Figure 4:
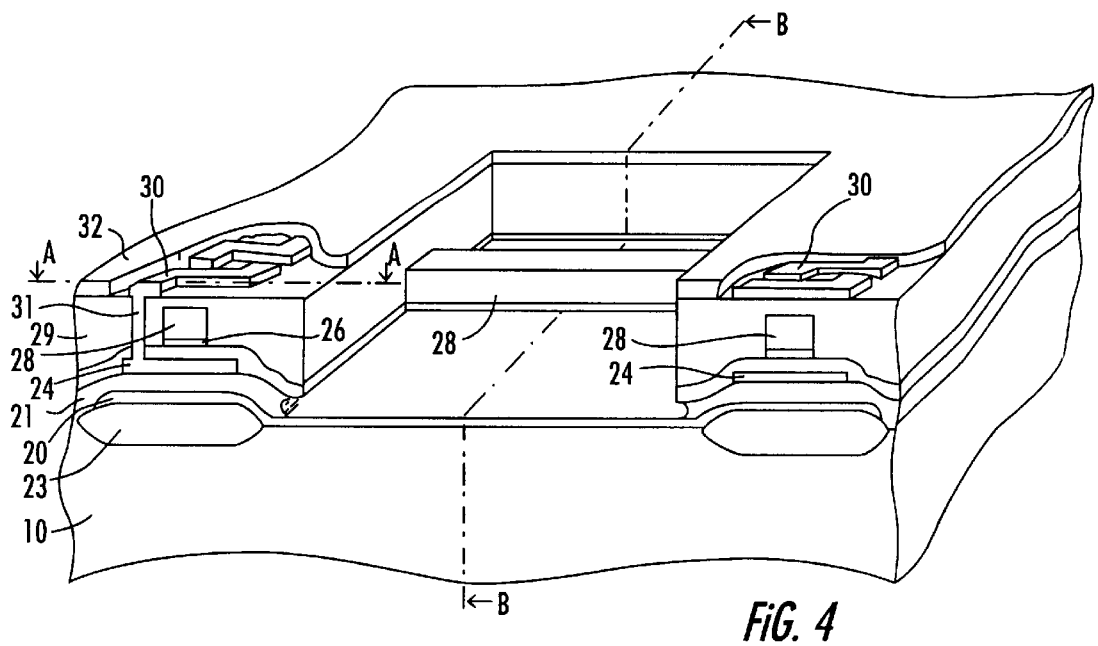
FIG. 4 is a perspective, sectional view of part of an acceleration sensor according to the invention.

FIG. 4 shows a portion of the substrate 10 containing the acceleration sensor according to the invention in a final stage in the manufacturing process. The various steps in the process are described with reference to FIGS. 5 to 16. It is noted that FIGS. 5 to 10 show the structure in section along the line A—A of FIG. 4 and FIGS. 11 to 16 show the structure in section along the line B—B of FIG. 4.

Figure 5:
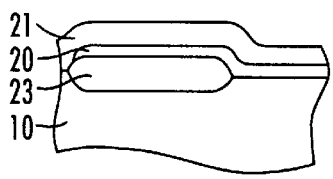
Figure 11:
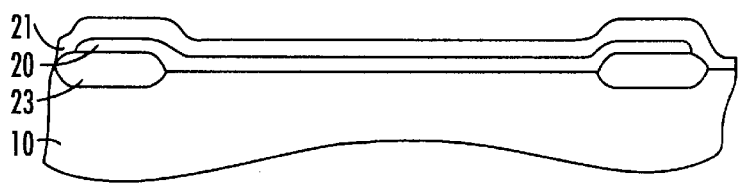

FIGS. 5 and 11 show the substrate 10 as it appears in the manufacturing step immediately after the deposition of a dielectric layer which serves to insulate the circuit elements of polycrystalline silicon, for example the gate electrodes of the MOSFET transistors, from the metals which will be formed during a subsequent step in the process. While in conventional processes the dielectric is provided solely by silicon dioxide, in the process of the invention it is provided by a layer of silicon nitride 20 with a layer of silicon dioxide 21 superimposed thereon. It should be noted that the substrate has pads 23 of silicon dioxide (field oxide) partly encapsulated in the single silicon crystal which define a sunken zone (active area) of the substrate by surrounding it. This structure is manufactured by the known oxidation technique for localized growth at high temperature in an oxidizing environment commonly used for the manufacture of MOS-type integrated circuits.

Figure 6:
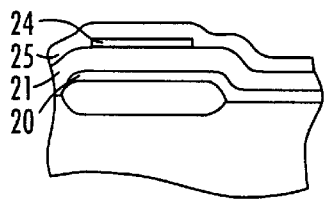
Figure 12:
Figure 7:
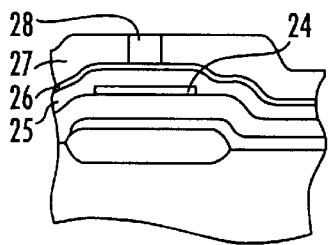
Figure 13:
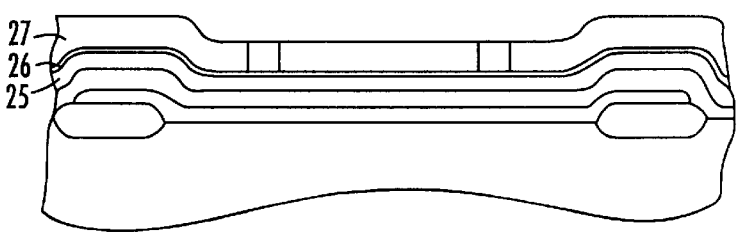

A metal layer, for example of aluminium, is deposited on the silicon dioxide layer 21 and from this there are formed, by known photolithographic techniques, metal segments 24 located in two adjacent series, like those indicated by reference numeral 30 in FIG. 4, intended to define parts of the windings 13 and 15. The whole is then covered by a layer 25 of silicon nitride (FIGS. 6 and 12). A layer 26 of metal, for example a chromium-copper-chromium multi-layer, is formed on the latter by vapor-phase deposition and serves to anchor the ferromagnetic core material firmly to the substrate. Then a layer 27 of a polymer, for example, a polyamide resin, is formed by spinning and baked in an oven. A recess in the form of a frame is formed in the polymer layer 27 by plasma etching through an aluminium mask. The recess formed is then filled with a ferromagnetic alloy, for example iron (19%) and nickel (81%) by electrolysis to form the core 28. The structure shown in FIGS. 7 and 13 is thus obtained.

The process continues with the removal of the remaining polymer layer 27 and the uncovered part of the nitride layer 26. A layer 29 of silicon dioxide is then formed (FIGS. 8 and 14) by deposition of tetraorthosilicate (TEOS) from the vapor phase at low pressure (LPCVD) and decomposition. Apertures are then formed in the layer 29 to form connection pathways between the metal segments 24 and similar segments which complete the turns of the windings 13 and 15. These segments, indicated 30, and the connection pathways, indicated 31, are formed by the usual photolithographic techniques by deposition and subsequent selective etching of a second metal, such as, for example, aluminium. A layer 32 of silicon dioxide doped with phosphorus is then deposited for insulation and passivation. At this point an aperture, in this case rectangular, is formed in the layers 32 and 29 of silicon dioxide by chemical etching (FIGS. 9 and 15) and then in the underlying layer 25 of silicon nitride to uncover two portions of two parallel sides of the frame-shaped core (FIG. 1).

Finally the structure is subjected to isotropic chemical etching, for example, by hydrofluoric acid, to remove the portion of the silicon dioxide accessible through the aperture, and thus uncovering the nitride layer 20. The structure shown in FIGS. 10 and 16 is thus obtained.

The thus formed structure is subjected to operations to form the electrical connections with the exterior and then encapsulated hermetically by conventional methods in a metal casing. This operation may be carried out in air or in nitrogen, preferably at a pressure below atmospheric.

Although only a single embodiment of the invention has been described and illustrated, it is clear that numerous variations and modifications may be made thereto with the use of the same innovative concept. For example, the ferromagnetic core could be of a different shape, for example it could be open instead of closed and have one or more, cantilevered portions instead of the suspended portions being anchored at both ends.

That which is claimed is:

1. An acceleration sensor comprising:

a semiconductor substrate;

a core of ferromagnetic material formed monolithically on said semiconductor substrate, said core having at least one suspended portion free to bend responsive to an inertial force caused by an accelerative movement of the sensor;

a first winding formed on a first portion of said core adapted to be connected to a power supply;

a second winding formed on a second portion of said core and being inductively coupled to said first winding through said core; and circuit means connected to said second winding for measuring an electrical quantity induced therein and representative of the accelerative movement of the sensor.

2. An acceleration sensor according to claim 1, wherein said core has a generally rectangular shape comprising first and second opposite pairs of sides; wherein the first pair of sides are fixed to said semiconductor substrate; and wherein said semiconductor substrate has a sunken area at least in correspondence with the second pair of sides thus defining two suspended portions of said core.

3. An acceleration sensor according to claim 1, wherein said circuit means is formed monolithically in said semiconductor substrate.

4. An acceleration sensor according to claim 1, further comprising a casing hermetically sealing said semiconductor substrate, said core, said first and second windings, and said circuit means in an air atmosphere.

5. An acceleration sensor according to claim 1, further comprising a casing hermetically sealing said semiconductor substrate, said core, said first and second windings, and said circuit means in a nitrogen atmosphere.

6. An acceleration sensor according to claim 1, further comprising a constant voltage supply connected to said first winding.

7. An acceleration sensor comprising:

a semiconductor substrate;

a core of ferromagnetic material formed monolithically on said semiconductor substrate, said core having a generally rectangular shape comprising first and second opposite pairs of sides, the first pair of sides being fixed to said semiconductor substrate;

said semiconductor substrate having a sunken area at least in correspondence with portions of the second pair of sides of said core thus defining two suspended portions of said core to be free to bend responsive to an inertial force caused by an accelerative movement of the sensor;

a first winding formed on a first one of the first pair of sides of said core and being adapted to be connected to a power supply;

a second winding formed on a second one of the second pair of sides of said core and being inductively coupled to said first winding through said core; and circuit means connected to said second winding for measuring an electrical quantity induced therein and representative of the accelerative movement of the sensor.

8. An acceleration sensor according to claim 7, wherein said circuit means is formed monolithically in said semiconductor substrate.

9. An acceleration sensor according to claim 7, further comprising a casing hermetically sealing said semiconductor substrate, said core, said first and second windings, and said circuit means in an air atmosphere.

10. An acceleration sensor according to claim 7, further comprising a casing hermetically sealing said semiconductor substrate, said core, said first and second windings, and said circuit means in a nitrogen atmosphere.

11. An acceleration sensor comprising:

a semiconductor substrate;

a core of ferromagnetic material monolithically formed on said semiconductor substrate, said core having at least one suspended portion; and output means formed monolithically on said semiconductor substrate for generating a signal representative of an acceleration of the sensor based upon movement of the at least one suspended portion of said core.

12. An acceleration sensor according to claim 11, wherein said output means comprises:

a first winding formed on a first portion of said core adapted to be connected to a power supply;

a second winding formed on a second portion of said core and being inductively coupled to said first winding through said core; and circuit means connected to said second winding for measuring an electrical quantity induced therein and representative of the acceleration of the sensor.

13. An acceleration sensor according to claim 12, wherein said core has a generally rectangular shape comprising first and second opposite pairs of sides; wherein the first pair of sides are fixed to said semiconductor substrate; and wherein said semiconductor substrate has a sunken area at least in correspondence with the second pair of sides thus defining two suspended portions of said core.

14. An acceleration sensor according to claim 12, wherein said circuit means is monolithically in said semiconductor substrate.

15. An acceleration sensor according to claim 11, further comprising a casing hermetically sealing said semiconductor substrate, said core, and said output means in an air atmosphere.

16. An acceleration sensor according to claim 11, further comprising a casing hermetically sealing said semiconductor substrate, said core, and said output means in a nitrogen atmosphere.

17. An acceleration sensor according to claim 12, further comprising a constant voltage supply connected to said first winding.

18. A method for making an acceleration sensor comprising the steps of:

monolithically forming a core of ferromagnetic material on a semiconductor substrate so that the core has at least one suspended portion; forming a first winding on a first portion of the core and adapted to be connected to a power supply; and forming a second winding on a second portion of the core to be inductively coupled to the first winding through the core.

19. A method according to claim 18, further comprising the step of forming monolithically a circuit in the semiconductor substrate for measuring an electrical quantity induced in the second winding and representative of an acceleration of the sensor based upon movement of the at least one suspended portion of the core.

20. A method according to claim 18, further comprising the step of forming a sunken semiconductor substrate area adjacent the at least one suspended portion of the core.

21. A method according to claim 18, further comprising the step of forming a casing hermetically sealing the semiconductor substrate, the core, and the first and second windings in an air atmosphere.

22. A method according to claim 18, further comprising the step of forming a casing hermetically sealing the semiconductor substrate, the core, and the first and second windings in a nitrogen atmosphere.

\* \* \* \* \*

UNITED STATES PATENT AND TRADEMARK OFFICE
CERTIFICATE OF CORRECTION

PATENT NO. : 6,003,374
DATED : December 21, 1999
INVENTOR(S) : Vigna et al.

It is certified that error appears in the above-identified patent and that said Letters Patent is hereby corrected as shown below:

Column 6, line 51   Delete:
"said circuit means is monolithically in said semiconductor"

Substitute:
-- said circuit means is formed monolithically in said semiconductor --

Signed and Sealed this

Eleventh Day of July, 2000

Attest:

Attesting Officer

Q. TODD DICKINSON

Director of Patents and Trademarks